United States Patent [19]

Stricker

[11] Patent Number: 5,549,250
[45] Date of Patent: Aug. 27, 1996

[54] PROCESS AND DEVICE FOR SORTING THERMOPLASTIC MATERIALS FROM A MIXED FLOW

[76] Inventor: Urban Stricker, Am Steimel 18, D-5912 Hilchenbach, Germany

[21] Appl. No.: 367,139
[22] PCT Filed: Jun. 22, 1993
[86] PCT No.: PCT/EP93/01583
  § 371 Date: Jan. 20, 1995
  § 102(e) Date: Jan. 20, 1995
[87] PCT Pub. No.: WO94/00241
  PCT Pub. Date: Jan. 6, 1994

[30] Foreign Application Priority Data

Jun. 24, 1992 [DE] Germany ............... 42 20 666.9
Jun. 7, 1993 [DE] Germany ............... 43 18 839.7

[51] Int. Cl.⁶ .................. B02C 18/06; B02C 18/18; B02C 19/00
[52] U.S. Cl. .............. 241/23; 241/24.18; 241/65; 241/79; 241/236; 241/24.28
[58] Field of Search ............... 241/23, 24, 65, 241/79, 236, DIG. 38

[56] References Cited

U.S. PATENT DOCUMENTS 3,960,335 6/1976 Haberle ..................... 241/236
4,098,463 7/1978 Lowry ........................ 241/17
5,115,987 5/1992 Mithal ....................... 241/23

FOREIGN PATENT DOCUMENTS 2430798 2/1980 France.
4033249A1 4/1992 Germany.
4112179C1 5/1992 Germany.
274932 9/1964 Netherlands.

Primary Examiner—John Husar
Attorney, Agent, or Firm—Herbert Dubno

[57] ABSTRACT

Process and apparatus for the storing of thermoplastic material from a mixed stream which can contain objects of other thermoplastic materials or other objects. The targeted thermoplastic material has a softening temperature which is below that of other materials in the mixed stream which is fed by a transport device through a heating unit which heats the mixed stream to the softening temperature. In the softened rubbery state of the thermoplastic material it tends to adhere to cutter blades which comminute the thermoplastic material preferentially while the remaining materials are rejected by the blades and remain uncomminuted to accomplish the sorting.

8 Claims, 5 Drawing Sheets

1

PROCESS AND DEVICE FOR SORTING THERMOPLASTIC MATERIALS FROM A MIXED FLOW

CROSS REFERENCE TO RELATED APPLICATIONS

This application is a national phase of PCT/EP93/01583 filed 22 Jun. 1993 and based upon German national application P 42 20 666.9 filed 24 Jun. 1992 and P 43 18 839.7 filed 7 Jun. 1993 under the International Convention.

FIELD OF THE INVENTION

The invention relates to a process for sorting thermoplastic materials from a mixed stream of materials, whereby the thermoplastic material to be separated is heated by convection or radiant heat to the range of its softening point and then taken together with the other material of the mixture to a grinding device. The invention relates further to a device for carrying out the process, having a transport and a heating installation and a grinding device arranged downstream thereof.

From DE-41 12 179 C1 a process is known for the clear separation of shaped thermoplastic parts of various origin. At a certain temperature or temperature range, each thermoplastic synthetic material passes from its solid state into the plastic state. The known process proposes to heat the various shaped parts without grinding through direct or indirect heating to a temperature which corresponds to the softening temperature of those shaped parts with the comparatively lowest softening temperature. The shaped parts are treated at that temperature until under the influence of gravity they lose their initial shape as much as possible through volume reduction. Subsequently the shaped parts which have been reshaped this way are separated from the shaped parts which have essentially kept their shape, by being sorted out, based on their different shape, while they are transported on a roller conveyor, whereby the respective reshaped parts fall through the gaps between the rollers and are removed from there as a homogeneous fraction., while the rest of the parts, which have remained mostly unchanged in shape are removed by the roller conveyor in the travel direction.

On the one hand the known process has a low yield, because the reshaping of for instance a hollow body into a flat state requires longer heating. The process is also limited to a narrowly defined spectrum of shaped parts such as cups, bowls, receptacles or the like, because objects with closed shapes such as bottles, containers, pipes or the like can be converted only with great difficulty into a clearly different shape. The sorting by shape requires on the one hand a special detection and logistics for waste products, on the other hand the latter can be non-destructively cleaned only with an unjustifiably high technical effort. However a cleaning is necessary, because particularly the residual humidity has a negative influence on the thermal treatment and thereby on the results of the process. Besides the sorting operation taking place after the thermal treatment relies purely on a sorting by shape.

OBJECT OF THE INVENTION

It is the object of the invention to provide a process and a device for the sorting of thermoplastic materials from a mixed stream which can overcome the above-mentioned drawbacks, difficulties and technical limits and which can make possible unobjectionable sorting based on different thermal softening behavior of the thermoplastic materials, with a high yield and precise selectivity.

SUMMARY OF THE INVENTION

In a process of the above-mentioned kind the invention solves this problem in that, based on the particle size and the elastic behavior of the softened thermoplastic material on the one hand and of the other materials in the mixture, on the other hand, only the softened thermoplastic materials are selectively picked out and ground by the grinding device, while the other materials in the mixture pass through the feeding and collecting area of the grinding device and are separately removed in an unground state.

This way the precise sorting according to indication of the softening point of a certain type of thermoplastic material due to the selective behavior of a grinding device is advantageously performed on a technical scale which makes possible a rational, economical as well as high-yield sorting of thermoplastic materials from a mixed stream, with comparatively low technical expense of investment and energy. Especially the grinding energy required within the general treatment process is considerably reduced.

Thermoplastic synthetic materials have a characteristic temperature range within which they pass from the solid state to a softened, rubber-like elastic state. When a mixture contains various types of synthetic material, through heating in stages it is possible to selectively soften one type of thermoplastic material, while the remaining thermoplastic materials are still in their solid state. The softened thermoplastic materials have a distinctly different behavior in the mixed stream when compared to the other thermoplastic materials which are still hard. This difference is advantageously used by the invention for a selective grinding and thereby for a sorting by means of different collecting behavior of a grinding device.

For a successful implementation of the process the nature and the composition of the mixed stream have to satisfy certain conditions. Presorted mixtures of all items originating from various fields of use such as packaging, disposable dishes, household, etc., can be sorted and ground at the same time with the process of the invention as long as they are not heavily contaminated. Other materials which are stuck to the targeted thermoplastic materials (paper labels, aluminum covers) can be at first ground together with the thermoplastic materials. They can be separated from the latter at a later point in time in a further treatment step or also during the secondary processing (separation from the melt), as far as they cannot be included in the secondary product. In order to be treated with the process of the invention, other product parts which can not be included in a product group have to be subjected to preliminary sorting, preliminary grinding and in certain cases also to a preliminary classification by their particle size.

In the first process step known per se the targeted thermoplastic material is heated by convection or radiant heat to reach its softening range and is then fed in a softened state together with the other materials of the mixture to a grinding device. The heating can take place selectively in different ways with respect to the softening. Through convection heating the entire mixed stream can be heated. The thermoplastic material with the lowest softening point will be softened first and is therefore the first targeted thermoplastic material. Through heating with infrared radiation certain types of thermoplastic materials can be heated better and in a more controlled way than other materials based on their chemical composition or their color and the thereto related specific infrared absorption behavior. Finally by means of high-frequency radiation, depending on the composition of the mixed stream, certain thermoplastic materials can be selectively heated and softened, without heating the other materials. Suitably the heating takes place continuously in a heating zone through which the goods to be heated are continuously carried to the heating elements, e.g. by a conveyor belt, or wherein the goods to be heated are constantly in contact with heating elements.

The mixed stream which now contains the targeted thermoplastic material in a softened state is taken to a grinding device, which as a result of its special design is capable of collecting and grinding only the softened materials. The harder thermoplastic materials cannot pass through the grinding mechanism and are removed from the grinding device.

According to the invention one embodiment of the grinding device for carrying out the process is designed like a two-shaft cutting mechanism, which has circular, mutually meshing cutting blades arranged on axially parallel shafts, whereby the intake angle $\alpha$ of the cutting blades, respectively the thereon depending intake depth h, the inclination angle $\beta$ between a tangential plane to the cutting blades and the horizontal and/or lateral inclination angle $\gamma$ of the two shafts with respect to the horizontal plane, as well as the configuration of the radial surface of the individual cutting blades are so attuned to each other with respect to the size of the product or of the particles of the mixture and the elastic behavior of the material component of the mixture, that a selective intake of softened thermoplastic materials is performed by the cutting mechanism and the other materials of the mixture pass through the feeding zone, whereby the intake angle $\alpha$ is selected as large as possible within the range of 5° and 175°, the inclination angle $\beta$ is selected as small as possible within the range of 95° and 175° and the inclination angle $\gamma$ is selected between 95° and 175° and the radial surface of the cutting blades is structured.

A suitable embodiment of the device proposes that for the setting of the angles ($\alpha$) and ($\beta$) and/or ($\gamma$), all or only selected connection elements of the shaft with the supporting housing be designed so that their setting can be changed.

Another embodiment of the grinding device for implementing the process for selectively sorting thermoplastic materials from a mixed stream with a transport and heating installation is characterized according to the invention in that it consists of several endlessly running saw wires or blades or a reciprocating saw forming a sawing plane, whereby the grinding device is arranged so that the stream of materials coming from the transport or heating installation is directed towards the feeding area of the saw over a slide or in free fall, whereby the cutting angle of the saws, their running direction and speed, as well as the gap width between the individual saws are so attuned to each other that the unsoftened materials are diverted and separately removed from the sawing area, this as a result of the type of feeding of the mixed stream through gravity and/or contact pressure of the material parts on the saws generated by additional acceleration, as well as a result of the adjustable inclination angle of the saw plane to the effective direction of the contact pressure, and in certain cases a result of the conveying efficiency of the saw plane.

A suitable embodiment of the grinding devices according to the invention provides that they should be temperature controlled. Thereby the capability of the device for selective intake, respectively collection of the presoftened materials is further activated and improved.

BRIEF DESCRIPTION OF THE DRAWING

The above and other objects, features, and advantages will become more readily apparent from the following description, reference being made to the accompanying drawing in which:

FIG. 3a is a detail view of a portion of a structured surface of a circular cutting blade;

The grinding device shown in FIGS. 1 to 5 has a reciprocally meshing two-shaft cutting mechanism. The circular cutting blades 4 are arranged on the shafts so that they intermesh deeply, in order to keep the intake angle $\alpha$ (defined between tangents to the blades at the points at which overlap or intermesh commences) as large as possible. For most cases, the cutting blades 4 are circular plates without teeth. As a result of this design an intake of hard materials in the cutting blades 4 is avoided. When the nature and the composition of the material to be selected are precisely known, the cutting mechanism can also be provided with cutting blades 4 equipped with a peripheral toothing.

Figure 1A:
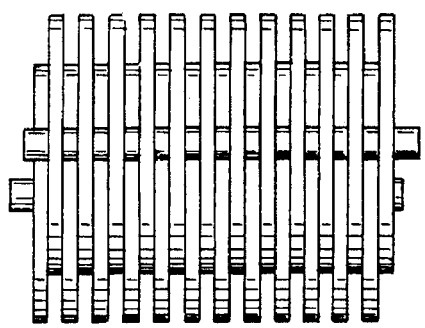
FIG. 1a is a front view of a two-shaft cutting mechanism of the invention.
Figure 1B:
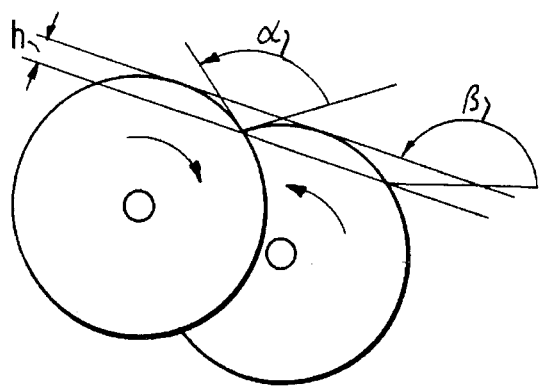
FIG. 1b is a side view of this mechanism.
Figure 1C:
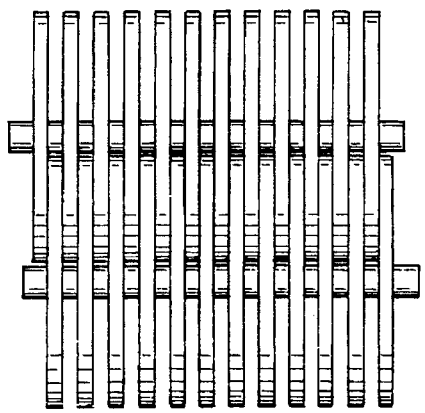
FIG. 1c is a top view thereof.
Figure 2:
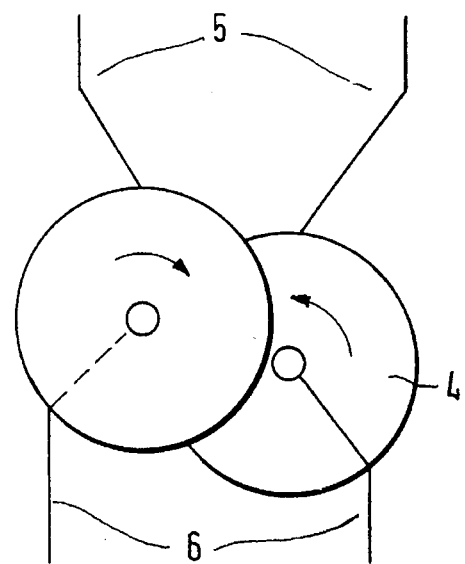
FIG. 2 is side view of the two-shaft cutting mechanism according to FIG. 1b with feeding funnel and discarding arrangement.
Figure 3:
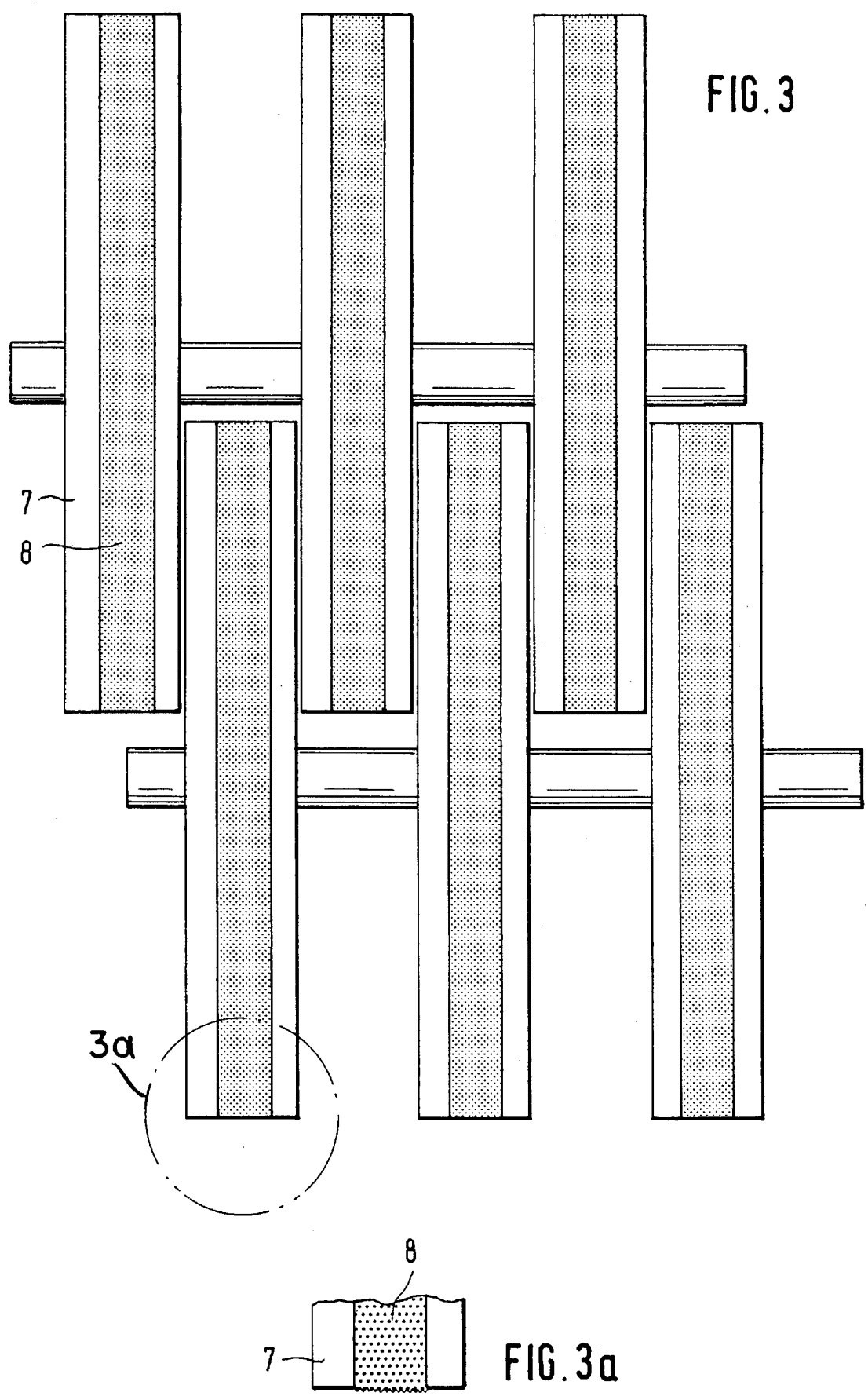
FIG. 3 is an enlarged top view of the two-shaft cutting mechanism.

The two shafts are mounted so that they are staggered in elevation, which can be seen especially from FIGS. 1 and 2. The thereby created inclination of the feeding plane is marked in FIG. 1b with the angle $\beta$ of a commer plane tangential to the cutting blades 4 of the two shafts with respect to the horizontal. This arrangement of the cutting blades favors the desired removal of hard materials from the intake gap. The usage of the inclination predetermined by the angle $\beta$ can for instance be sufficient in some cases for supporting a selective grinding of the materials.

A limitation of the feeding surface by means of lateral baffles 5 corresponding to an illustration in FIG. 2 serves for a secure feeding and removal of the thermoplastic material to be ground, as well as of the ones to be removed.

The intake of softened thermoplastic materials is made possible by the fact that as a result of their plasticity these materials intrinsically adhere at least partially to the cutting blades 4 and then, due to the reciprocal meshing of the blades 4, are drawn towards the cutting gap and gripped, whereby based on their elasticity they are bluntly cut, squeezed and finally pulled in. The intake of softened thermoplastic materials adhering to the surface of blades 4 can be enhanced by providing the periphery of the cutting blades totally or partially with a structured surface. Such structuring is shown purely schematically in FIG. 3, whereby the reference numeral 7 marks a smooth surface and the reference numeral 8 marks a structured surface. This structuring can be done in the shape of a knurling or in the form of a relatively shallow serration. This is meant to facilitate an increased friction of softened thermoplastic materials. At the same it diverts of rejects harder materials due the basically flat radial surface of the cutting blades 4.

Figure 4:
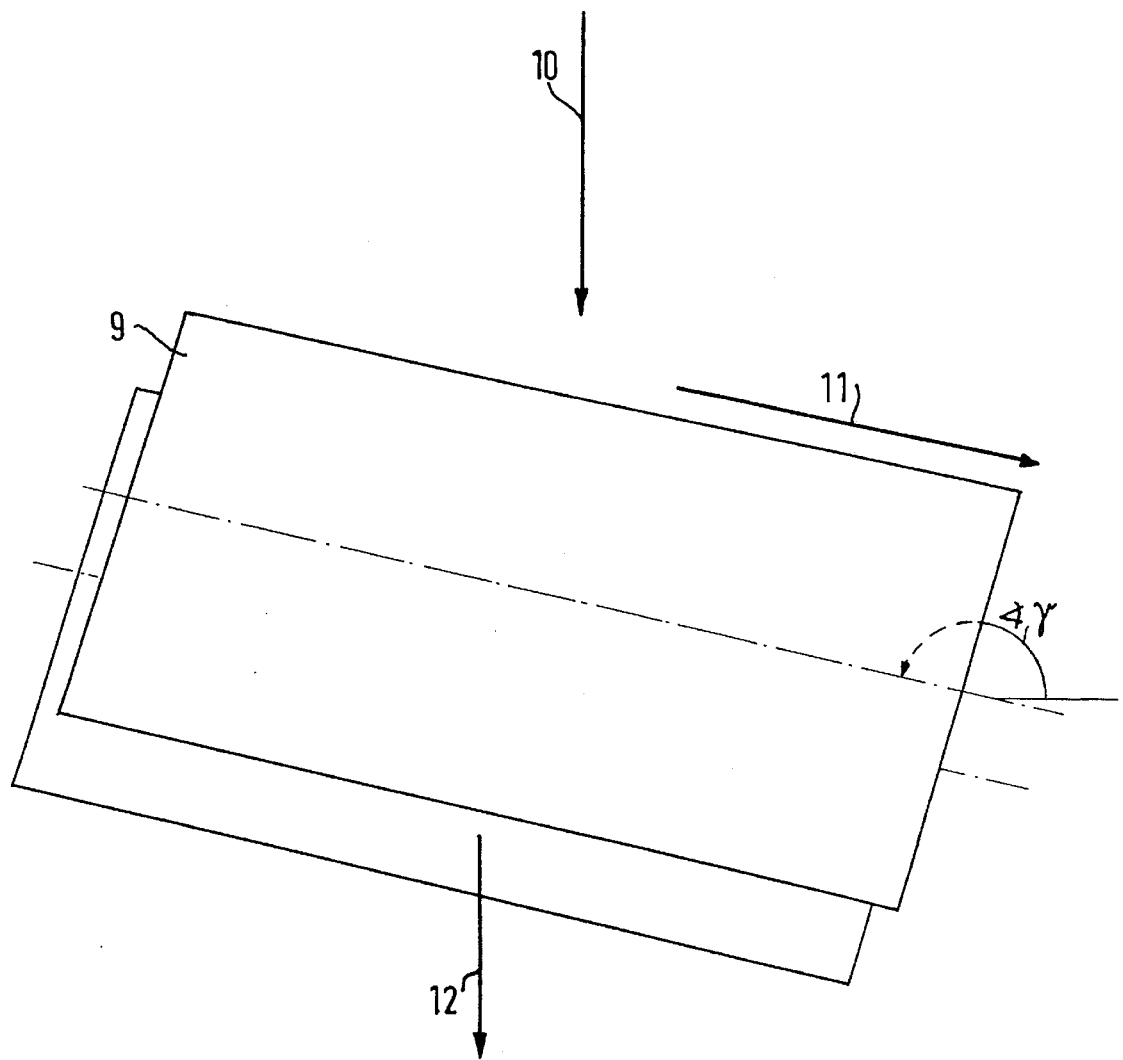
FIG. 4 is a front view of the two-shaft cutting mechanism in a laterally inclined position with respect to the horizontal.

The separate removal of the harder thermoplastic materials which have not passed through the cutting gap can be achieved by arranging the entire cutting mechanism over its width, as shown in FIG. 4, with an angle γ of less than 90° with respect to the vertical. The supplied material 10 falls at first in vertical direction unto the cutting mechanism 9. Hard materials are not drawn in and leave the feeding surface due to the inclination γ of the cutting mechanism and due to their gravity, in a lateral direction as indicated by arrow 11. Softened thermoplastic materials 12 are pulled in by the cutting mechanism 9, pass through it and leave it in ground state in a downward direction.

In order to insure a safe detachment of the softened thermoplastic materials from the cutting blades 4, the cutting mechanism 9 can be provided in its lower area with combs 6, which scrape off the thermoplastic materials or thermoplastic residue adhering to the cutting blades 4. Such an arrangement is shown purely schematically in FIG. 2 with the scraping combs 6.

After the characteristics regarding the nature and the composition of the mixed stream reaching the cutting mechanism 9 have been indicated, when there is a sufficiently small angle β in certain cases the inclination of the cutting mechanism 9 by an angle γ can be dispensed with. According to FIG. 5, the cutting mechanism 9 is then arranges so that the feeding of the mixed stream 18 and the discharge 20 of the rejected hard materials take place over the guides 15, which approximately prolong the angle β of the feeding surfaces. The supplied mixed stream is marked with the arrow 18 and the removed partial stream with the arrow 20. The ground thermoplastic material is marked with arrow 19. For the scraping of the circular blades 4 the scraping combs 6 are provided.

Figure 5:
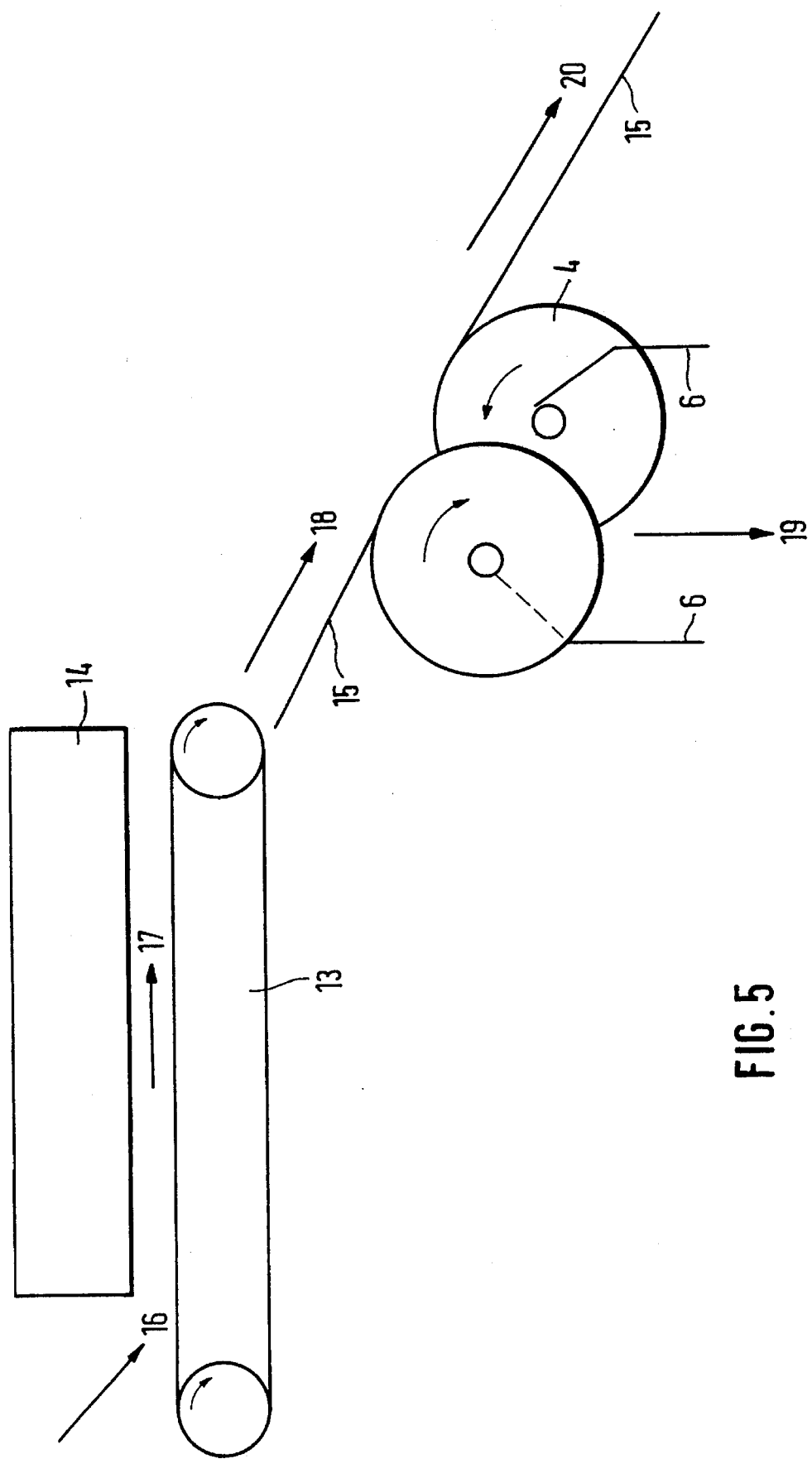
FIG. 5 is flow diagram illustrating the process as well as the pertaining device.

In FIG. 5 a complete device according to the invention is purely schematically in a flow chart. The apparatus comprises a heating region 17 with a conveyor belt 13, above which at least one heating element 14, e.g. an infrared radiation element or a high-frequency source. The mixture supply is shown at 16, while the heated mixture flowing off the conveyor belt 13 is indicated with the arrow 18. The discharge of the ground targeted thermoplastic material is represented at 19, the discharge of the other mixture components is referred to at 20 on the slide 15.

Example of Use

In the Federal Republic of Germany plastic yoghurt containers are made of polypropylene (PP) or polystyrene (PS), abroad they are made also of polyvinyl chloride (PVC). A sorting or separation of the types of plastic material is a precondition for a high-value recycling or further processing of plastic materials.

A separation of all three plastic packaging materials used as yoghurt containers can be performed by means of the subsequently described device of the invention.

The packaging is fed in an unground state to a conveyor belt 13. The conveyor belt 13 passes through the heating zone 17, whereby due to a corresponding tuning between belt speed, length of the heating zone 17, as well as heat supply by a heat element 14 at first only the PVC is selectively softened (temperature of goods approximately 80°). All the goods fall then onto a first selective cutting mechanism as described above. The PVC passes through the cutting mechanism and is delivered to a storage, the PS and the PP are either discharged via a lateral inclination (angle γ) or in inclination in the travel direction (angle β), and reach a further conveyor belt, whereby in a further heating zone the PS is selectively heated (approximately 105° C.). In a second selecting cutting mechanism the PS is ground and the PP is discharged. This way all three types of plastic material are clearly sorted.

The advantage of this type of use is that the involved thermoplastic materials are softened well below their melting range, thereby the emissions of gaseous decomposition products of the plastic materials are excluded and a smudging of the softened thermoplastic materials in the cutting mechanism is not to be expected. If only two types have to be separated (PS and PP) a correspondingly simpler design is sufficient. Such a simplified design allows for the decentralized use of compact devices in the collection of plastic waste, which results in a further advantage based on the volume reduction of plastic waste connected with this process.

Also other combinations of types of thermoplastic material, such as resulting from other fields of application, can be separated from each other. For instance this way it is possible to perform the separation of PVC, PE, PP and PET originating from the field of application of hollow bodies.

Precrushed and preferably cleaned mixtures of plastic scrap, which can also originate from various uses, are also accessible to the process of the invention. For sorting several targeted thermoplastic materials the devices of the invention can be arranged in cascade-like succession. In order to avoid the intake by the first selecting cutting mechanism of the small particles to be expected in such mixtures, the particle mixture is first suitably screened, so that only sufficiently large particles reach the treatment area.

An improved performance of the device according to the invention is achieved, depending on the respective application, through the use of suitable heat sources for the selective heating (convection, infrared or high-frequency radiation) as well as through the suitable setting of the amount of heat supplied, which is determined by the parameters of belt speed, belt length and arrangement of the heating elements. Also variations in the design of the selecting cutting mechanism regarding the surface configuration of the cutting blades, the intake angle α, the intake depth h and the inclination angles β and γ, as well as the integration of the cutting mechanism in the general material flow can be used for improvements in a certain application case. A variability of the parameters h, α, β and γ of the cutting mechanism can be made possible by providing that the corresponding connections at the supports of the cutting mechanism be built to be adjustable. Furthermore the cutting mechanism can be temperature controlled, this way improving the intake of preheated targeted thermoplastic materials. In selected cases the targeted thermoplastic material can be softened through contact with the controlled temperature cutting mechanism and drawn in by the same.

Because of the reciprocally meshing circular cutting blades, the comminuting device built as a two-shaft cutting mechanism requires a relatively large diameter of these cutting blades in order to achieve a sufficiently flat intake angle. After the characteristic data about the nature and composition of the plastic components to be processed have been indicated in the different hardness, respectively softening state, it has also proven to be suitable to adjust the diameter of the cutting blades at least approximately to the size and shape of the thermoplastic parts. Furthermore it has proven suitable to adjust the degree of radial surface structuring of the cutting blades to the elasticity differences of the thermoplastic parts to be sorted.

The prevailing conditions can be also varied through another embodiment of the grinding device of the invention. Surprisingly it has been found that a selective intake of thermoplastic parts in a softened state with the thereby effected selective grinding as a basis for sorting leads to particularly good results when the grinding device consists of endlessly running saw wires or saw blades forming a sawing plane or of a reciprocating saw, whereby the grinding device is arranged so that the material stream coming from the transport or heating installation is directed towards the feeding area of the saw over a slide or in free fall, and the cutting angles of the saws, their running direction and their speed, as well as the gap width between the individual saws are so attuned to each other that, as a result of the way in which the material stream is fed based on gravity and/or contact pressure caused by additional acceleration, at the impact of the material parts on the saw plane, as well as a due to the size, respectively mass of the material parts, a selective intake and crushing of softened thermoplastic materials results, and these pass through the saw, while due to an adjustable inclination angle of the sawing plane with respect to effective direction of the contact pressure force and in some cases due to a conveying action of the saws, the unsoftened materials are diverted from the sawing plane and are then separately removed.

Figures 6, 6A:
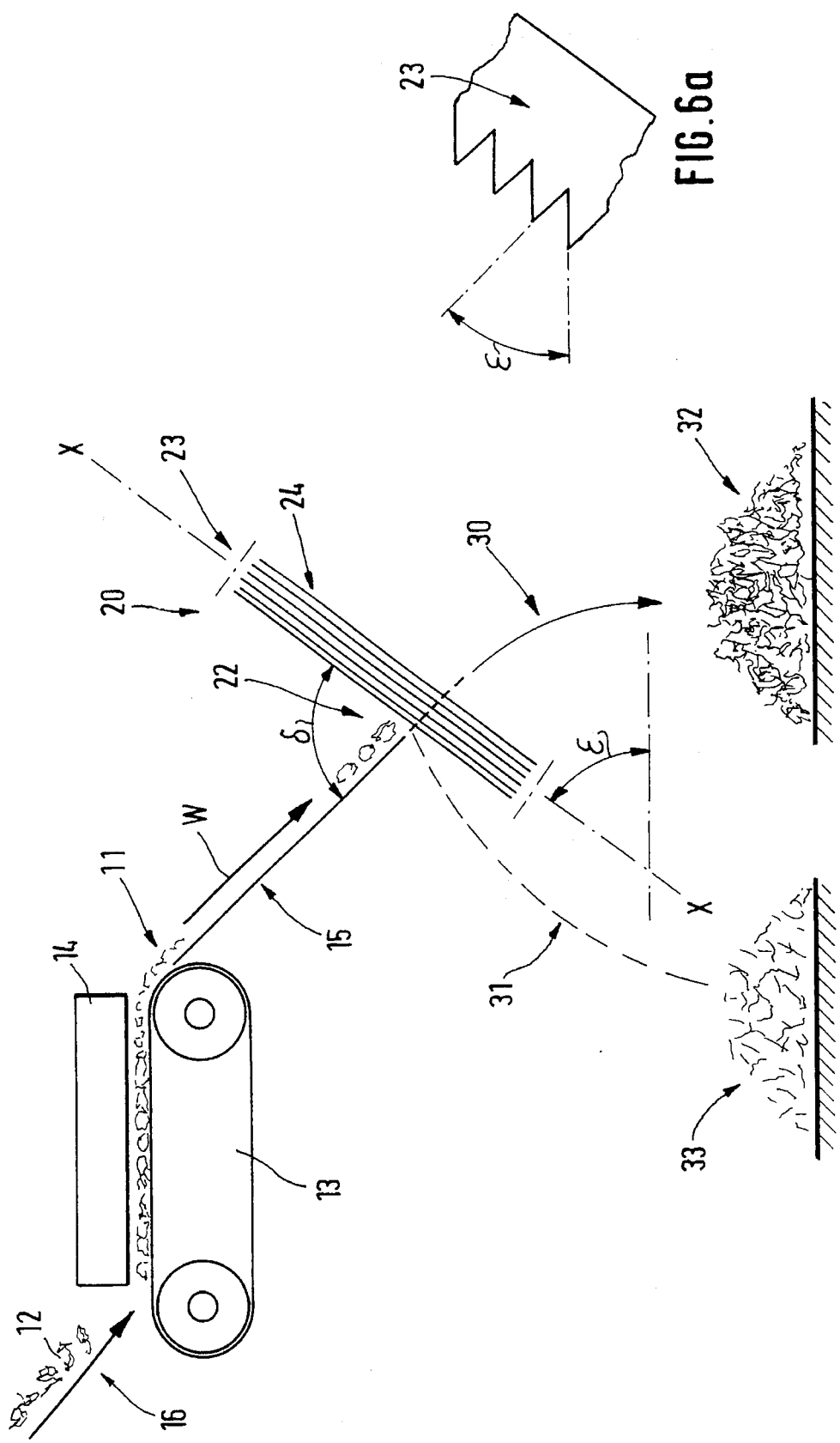
FIG. 6 is a flow diagram illustrating the process as well as an alternate device.
FIG. 6a is a in detail view of saw teeth of a saw blade.

According to FIG. 6 a mixed stream 12 of thermoplastic materials to be sorted is fed to the feeder 16 of the transport system 13 and during their transport towards the end of the feeder are heated by means of a heating system 14 to the softening point of those components which have the lowest softening point, e.g. within the range of 95° and 105°. This way at the discharge 11 of the transport system 13 the heated mixed stream W contains softened and unsoftened thermoplastic particles. These land on the slide 15 and partially due to gravity and in some cases also due to the acceleration of any accelerating device unto the sawing plane x-x. The latter consists either of endlessly running saw blades 23 or respectively saw wires 24 or is designed like a reciprocal saw. Thereby the sawing elements are arranged next to each other in such a way that a plane x-x created by the sawing elements 23 or 24, subsequently referred-to as the sawing plane x-x, forms the intake area 22.

The feeding of the material stream W to the sawing plane x-x can take place in the most simple case only as a result of gravity. By additionally using an accelerating device it is also possible to bring accelerated particles into the intake area 22. Such accelerating devices can for instance be high-speed conveyor belts, centrifugal accelerators or oriented compressed-air nozzles. In the latter case the compressed air can be supplied at the temperature of the softened components.

The sawing plane x-x is arranged at an angle δ between 10° and 90° with respect to the feeding direction of the material stream W. In this way either through gravity or also due to acceleration a contact pressure of the material parts on the sawing plane x-x is generated. In correlation with the given data regarding the configuration of the saw teeth, the saw speed, the sawing effect reachable through angle δ this contact pressure is selected so that an intake and crushing of the softened plastic parts takes place, while the unsoftened plastic parts are not taken in by the saw and also are not crushed. The sawing plane x-x forms an adjustable w [sic, should be ω—see FIG. 6, translator's note]the horizontal.

The parts of the material stream W should advantageously have a size corresponding to the gap between the individual sawing elements 23, respectively 24, namely so that they have a size of sufficient magnitude in order not to pass the sawing plane x-x without being crushed. In this regard, the previously mentioned arrangement of a succession of several sawing planes x-x would ensure an increased operational safety. These sawing planes x-x can be designed with gradually staggered gaps between the saw blades or saw wires, which narrow towards the exit side. Further its is suitable to arrange these gradually staggered sawing planes so that they do not form continuous gaps or passages, but are arranged in succession with lozenged passages.

The sawing plane x-x can be arranged in an angle ω to the horizontal, or in a complementary angle to the vertical, so that unsoftened material parts 31 are diverted from the sawing plane x-x due to gravity. If endlessly running sawing elements 24 are used, in some cases on the sawing plane x-x a conveying effect results, which is used as additional means for diverting the unsoftened material parts 31. The softened material parts 30, after passing through the saw 23, are discharged to the heap 32, while the unsoftened particles 31 are discharged to the heap 33.

By means of the grinding device 20 designed as a saw 23, 24 forming a sawing plane x-x, its adjustability in angle δ to the feeding direction of the material stream ω as well as to the horizontal in the angle (δ) [sic], further by setting the gap between the individual saw blades and saw wires 23, or 24, a selective intake and crushing of types of plastic materials with different softening degree, and thereby a safe, economical and high-yield sorting of various types of plastic material is made possible. In the grasping and intake behavior of the saw blades 23, or 24, which here have to be fine tuned, an optimization of the saw tooth shape and of the cutting angle is also important and is adjusted by the person skilled in the art according to experience and skilled consideration of the respective characteristics of the material of the softened thermoplastic components.

I claim:

1. A process for sorting a thermoplastic material from a mixed stream containing objects of said thermoplastic material which has a certain temperature at which said thermoplastic material is softened to a rubbery state, said stream containing objects of other materials which are harder than said material in said rubbery state and which, if they have softening temperatures, said softening temperature is greater than said certain temperature, said process comprising the steps of:

(a) passing said mixed stream on a transport device through a heating device and heating said mixed stream to said certain temperature and softening said objects of said thermoplastic material selectively into said rubbery state in a heated mixed stream;

(b) feeding said heated mixed stream with force into an intake zone of a grinder having relatively moving cutting members oriented and driven so that only said thermoplastic material in said rubbery state is gripped by said moving cutting members and comminuted in said grinder to feed comminuted softened material along one path while unsoftened thermoplastic materials and objects harder that the softened thermoplastic material pass uncomminuted along another path; and (c) separately collecting comminuted softened thermoplastic material and uncomminuted material displaced along said paths.

2. The process defined in claim 1 wherein said heated mixed stream is fed with force into said intake zone of said grinder by gravitationally displacing said mixed stream downwardly along a ramp leading to said grinder.

3. The process defined in claim 2 wherein said grinder comprises counterrotating circular intermeshing cutting blades arranged on mutually parallel shafts and defining an intake angle of 5° to 175°, said shafts being vertically staggered so that a plane tangent to the blades of both said shafts forms an angle with the horizontal of 95° to 175° and comminuted thermoplastic material passes along said path between said blades while uncomminuted objects passing along said other paths pass over said blades.

4. The process defined in claim 3, further comprising the step of treating said blades along peripheries thereof to promote entrainment of softened thermoplastic material by said blades.

5. The process defined in claim 2 wherein said grinder comprises a plurality of saw blades and comminuted thermoplastic material passes along said one path through said plurality of saw blades while uncomminuted material is collected in said other path without passing through said saw blades.

6. The process defined in claim 5, further comprising the step of heating said blades.

7. An apparatus for sorting a thermoplastic material from a mixed stream containing objects of said thermoplastic material which has a certain temperature at which said thermoplastic material is softened to a rubbery state, said treatment containing objects of other materials which are harder than said material in said rubbery state and which, if they have softening temperatures, said softening temperature is greater than said certain temperature, said apparatus comprising:

a transport device for displacing said mixed stream;

a heating device along a path of said transport device for heating said mixed stream to said certain temperature and softening said objects and said thermoplastic material selectively into said rubbery state in a heated mixed stream;

a grinder downstream of said transport device for receiving said heated mixed stream with force and an intake zone of said grinder, said grinder comprising a plurality of circular blades on each of two mutually parallel shafts forming an intake zone for said heated mixed stream, said blades intermeshing with one another and said shafts being vertically staggered whereby tangential planes to the blades of the two shafts include an intake angle $\alpha$ between them an a common tangent plane to the blades of both shafts includes an angle $\beta$ with a horizontal, the vertex of the angle $\alpha$ lying at a depth h beneath said common tangent plane, said shafts being inclined to the horizontal at an angle $\alpha$, wherein $\gamma$ is selected as large as possible within a range of 5° to 175°, $\beta$ is selected as small as possible between 95° and 175°, $\gamma$ is selected between 95° and 175° and surfaces of said blades have a fine structuring such that only said thermoplastic material in said rubbery state is gripped by said moving cutting members and comminuted in said grinder to feed comminuted softened material along one path while unsoftened thermoplastic materials and objects harder that the softened thermoplastic material pass uncomminuted along another path; and means for separately collecting comminuted softened thermoplastic material and uncomminuted material displaced along said paths.

8. The apparatus defined in claim 7, further comprising means for stripping adhering material from said blades.

* * * * *